US011195029B2

(12) United States Patent
Meis et al.

(10) Patent No.: US 11,195,029 B2
(45) Date of Patent: Dec. 7, 2021

(54) DRIVER ASSISTANCE SYSTEM

(71) Applicant: Conti Temic microelectronic GmbH, Nuremberg (DE)

(72) Inventors: Urban Meis, Göppingen (DE); Markus Gressmann, Böblingen (DE); Franz Pfeiffer, Einsingen (DE); Christian Wolbold, Renningen (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 237 days.

(21) Appl. No.: 15/432,075

(22) Filed: Feb. 14, 2017

(65) Prior Publication Data

US 2017/0154226 A1    Jun. 1, 2017

Related U.S. Application Data

(63) Continuation of application No. PCT/DE2015/200386, filed on Jun. 22, 2015.

(30) Foreign Application Priority Data

Aug. 14, 2014    (DE) .................. 10 2014 216 159.2

(51) Int. Cl.
*H04N 13/02*    (2006.01)
*G06K 9/00*    (2006.01)
(Continued)

(52) U.S. Cl.
CPC ......... *G06K 9/00805* (2013.01); *B60W 10/04* (2013.01); *B60W 10/18* (2013.01);
(Continued)

(58) Field of Classification Search
CPC .......... G06K 9/00805; G06K 9/00825; H04N 13/0203; G08G 1/166; G05D 1/0246; G05D 1/0238; G05D 1/0257; G05D 1/0055
(Continued)

(56) References Cited

U.S. PATENT DOCUMENTS 8,639,433 B2    1/2014  Meis et al.
9,224,055 B2 *  12/2015 Kido .................. G06K 9/00791
(Continued)

FOREIGN PATENT DOCUMENTS

DE          10256529 A1    6/2004
DE        102006046903 A1  4/2008
(Continued)

OTHER PUBLICATIONS

International Search Report and Written Opinion dated Oct. 30, 2015 from corresponding International Patent Application No. PCT/EP2015/200386.
(Continued)

*Primary Examiner* — Zaihan Jiang

(57) ABSTRACT

The invention relates to a driver assistance system for a motor vehicle, comprising an environment camera for generating image data, which represent the environment of the motor vehicle, and comprising a control and evaluation unit, wherein the control and evaluation unit is designed to evaluate the image data and detect objects in such a way that partially transparent regions are detected in the case of primary objects, in particular primary vehicles, in the environment of the motor vehicle.

26 Claims, 1 Drawing Sheet

(51) Int. Cl.
| | |
|---|---|
| *G05D 1/00* | (2006.01) |
| *G05D 1/02* | (2020.01) |
| *G08G 1/16* | (2006.01) |
| *H04N 7/18* | (2006.01) |
| *B60W 50/00* | (2006.01) |
| *B60W 10/04* | (2006.01) |
| *B60W 10/18* | (2012.01) |
| *B60W 30/16* | (2020.01) |
| *H04N 13/204* | (2018.01) |

(52) U.S. Cl.
CPC ........ *B60W 30/16* (2013.01); *B60W 50/0097* (2013.01); *G05D 1/0055* (2013.01); *G05D 1/0238* (2013.01); *G05D 1/0246* (2013.01); *G05D 1/0257* (2013.01); *G06K 9/00791* (2013.01); *G06K 9/00825* (2013.01); *G08G 1/166* (2013.01); *H04N 7/18* (2013.01); *H04N 13/204* (2018.05); *B60W 2554/80* (2020.02); *B60W 2555/60* (2020.02)

(58) Field of Classification Search
USPC .......................................................... 348/113
See application file for complete search history.

(56) References Cited

U.S. PATENT DOCUMENTS

| | | | | |
|---|---|---|---|---|
| 9,296,374 | B2 * | 3/2016 | Yamakado | B60W 40/114 |
| 9,658,327 | B2 | 5/2017 | Hisateru | |
| 9,762,880 | B2 * | 9/2017 | Pflug | G06T 15/20 |
| 10,114,117 | B2 * | 10/2018 | Salmen | G01S 17/894 |
| 2010/0292886 | A1 * | 11/2010 | Szczerba | G01S 13/723 |
| | | | | 701/31.4 |
| 2011/0122049 | A1 * | 5/2011 | Lvovskiy | G02B 27/0101 |
| | | | | 345/1.3 |
| 2012/0089273 | A1 * | 4/2012 | Seder | B60Q 1/268 |
| | | | | 701/2 |
| 2012/0218125 | A1 * | 8/2012 | Demirdjian | G08G 1/164 |
| | | | | 340/905 |
| 2013/0038730 | A1 * | 2/2013 | Peterson | B60R 11/0235 |
| | | | | 348/148 |
| 2014/0046505 | A1 * | 2/2014 | Sakoda | G06F 17/00 |
| | | | | 701/2 |
| 2014/0118523 | A1 * | 5/2014 | Li | G06K 9/325 |
| | | | | 348/78 |
| 2014/0218530 | A1 * | 8/2014 | Sinclair | G06T 7/254 |
| | | | | 348/148 |
| 2014/0236449 | A1 * | 8/2014 | Horn | B60W 30/16 |
| | | | | 701/96 |
| 2014/0313409 | A1 * | 10/2014 | Schramm | H04L 12/6418 |
| | | | | 348/441 |
| 2015/0077564 | A1 * | 3/2015 | Swindord | H04N 7/18 |
| | | | | 348/148 |
| 2015/0217690 | A1 * | 8/2015 | Mitsuta | H04N 7/181 |
| | | | | 348/148 |
| 2015/0222858 | A1 * | 8/2015 | Tanuki | H04N 7/181 |
| | | | | 348/148 |
| 2015/0258996 | A1 * | 9/2015 | Victor | G08G 1/0962 |
| | | | | 340/576 |
| 2017/0072857 | A1 * | 3/2017 | Kowatari | G06K 9/00791 |
| 2019/0236941 | A1 * | 8/2019 | Lindsay | B60Q 1/44 |

FOREIGN PATENT DOCUMENTS

| | | |
|---|---|---|
| DE | 102009057553 A1 | 6/2011 |
| DE | 102011102512 A1 | 11/2012 |
| JP | H10181487 A | 7/1998 |
| JP | 2001273588 A | 10/2001 |
| JP | 2013205276 A | 10/2013 |
| WO | 2013079057 A1 | 6/2013 |
| WO | WO2013083313 A1 | 6/2013 |

OTHER PUBLICATIONS

Kenta Tanaka et al., "Effects of Indicating Evaluation Index Considering Pre-preceding Vehicle Information on Driving Behavior", 2013, pp. 131-140, vol. 15, No. 2, https://www.jstage.jst.go.jp/article/his/15/2/15_131/_pdf/-char/en.

Japanese Notice of Allowance dated Apr. 10, 2020 for the counterpart Japanese Application Number.

* cited by examiner

DRIVER ASSISTANCE SYSTEM

CROSS REFERENCE TO RELATED APPLICATIONS

This U.S. patent application claims the benefit of PCT patent application No. PCT/DE2015/200386, filed Jun. 22, 2015, which claims the benefit of German patent application No. 10 2014 216 159.2, filed Aug. 14, 2014, both of which are hereby incorporated by reference.

TECHNICAL FIELD

The invention relates to a driver assistance system for a motor vehicle having an environment camera for generating image data, which represent the environment of the motor vehicle.

BACKGROUND

Currently, motor vehicles for road transport are increasingly being equipped with driver assistance systems. Suitable driver assistance systems are thereby used in particular to increase safety and to prevent accidents. Most of the driver assistance systems in use at present are designed to assist a driver or vehicle operator during the operation of the vehicle.

Thus, for example, a device for detecting braking situations can be inferred from WO 2013/083313 A1, in which device an image-taking device is arranged in a vehicle and detects a traffic route and in which a red component in the images of the image-taking device is evaluated.

In addition, driver assistance systems for motor vehicles are known, for example, which are designed for a longitudinal control, in particular a distance control. In these systems the area in front of the motor vehicle is monitored by the sensors of a radar system and the sensor data of the radar system is evaluated with the aid of an evaluation unit, wherein a vehicle driving in front is detected as an obstacle. If the motor vehicle having the driver assistance system falls below a predetermined minimum distance from the vehicle driving in front, the driver assistance system reduces the speed of the motor vehicle fully automatically, until the predetermined minimum distance is exceeded again. If the distance from the vehicle driving in front increases above the predetermined minimum distance, the driver assistance system increases the speed of the motor vehicle again, at least up to a threshold predetermined by the driver of the motor vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The driver assistance system is thereby designed for a motor vehicle and is accordingly used in a motor vehicle. It comprises an environment camera for generating image data, which represent the environment of the motor vehicle or at least the area in front of the motor vehicle, as well as a control and evaluation unit which is designed to evaluate the image data and detect objects. The evaluation and object detection are effected in such a way that objects, in particular vehicles such as, for example, passenger cars, are detected in the area in front of the motor vehicle having the driver assistance system and that, in addition, partially transparent regions are determined in the case of these objects. The objects are thereby located in the immediate field of view of the environment camera and said objects are referred to hereinafter as primary objects or primary vehicles.

In many situations, the primary objects, i.e. typically vehicles immediately in front, conceal the direct view of additional relevant objects, hereinafter referred to as secondary objects, which are located in front of the primary objects, for which reason said secondary objects are not captured by an environment camera of a driver assistance system according to the prior art. However, the driver assistance system presented herein exploits the fact that vehicles, in particular passenger cars, typically have an at least partially transparent rear window and an at least partially transparent windshield, through which a driver of a following motor vehicle typically looks, in order to practice so-called predictive vehicle operation in this way. This approach is imitated with the driver assistance system presented here and, to this end, the control and evaluation unit determines partially transparent regions in the case of detected primary objects. In favorable cases, said partially transparent regions can be used as a viewing channel or viewing tunnel through the primary object, so that said region can be used to extend the effective field of view.

If a suitable partially transparent region is determined in the case of a primary object, the image data of the environment camera, which represent the detected partially transparent region, are evaluated by the control and evaluation unit in such a way that secondary objects in the environment and, in particular, in the area in front of the motor vehicle having the driver assistance system are detected, which are represented through the partially transparent region in the case of the primary object. In simple terms, if vehicles are driving in front a check is carried out to establish whether it is possible to see through the rear window and the windscreen of the vehicle driving in front, if present, and, if this is the case, this possibility is exploited as well. Subsequently, not only is the behavior of the vehicle immediately in front monitored but, in addition, the traffic situation outside the immediate field of view of the environment camera in front of the vehicle immediately in front.

To this end, the image data, which represent a detected primary object, i.e. for example, a passenger car immediately in front, are preferably subjected to an additional analysis, within the framework of which a check is carried out to establish whether a sufficiently transparent object, i.e. in particular a rear window, can be detected in the representation of the primary object. The corresponding rear window is thereby detected depending on the intended application with the aid of different algorithms or operators, i.e. for example with the aid of symmetry operators or with the aid of an edge detection. It is additionally possible, in order to determine a rear window region in the case of a vehicle immediately in front, to evaluate a sequence of images of the environment camera and to hereby analyze the optical flow. A search is hereby made, within the image sections which represent the vehicle immediately in front, for characteristic objects and/or characteristic movements such as, for example, reflector posts which are located within the image sections, which represent the vehicle immediately in front and which are moving relative to the edge of the image sections. In addition, in some possible applications, partially transparent regions are determined in the case of primary objects in that structures or objects within the image sections, which represent the primary object, are determined by means of a distance-measuring method, the distance of which from the motor vehicle having the driver assistance system deviates significantly from the distance between the primary object and the motor vehicle having the driver assistance system. Suitable distance-measuring methods are thereby known in principle. Therefore, a so-called "Structure from Motion" method can be used in the case of a monocular environment camera, whereas in the case of a binocular or multiocular environment camera just the stereo effect is exploited.

If an appropriate image section, which represents a partially transparent region, is detected and an appropriate viewing channel through the rear window and the windscreen of a vehicle immediately in front is determined, the image data of this image section are evaluated, in order to determine and detect secondary objects, which are not located in the immediate field of view of the environment camera at least in part due to the vehicle immediately in front, in this region. All of the objects which are relevant to the traffic situation are captured and detected, i.e. including traffic signs or traffic lights for example, as secondary objects.

According to one embodiment of the driver assistance system, additional road users are simply detected as secondary objects, i.e. for example trucks, passenger cars, motorcycles, bicycles or pedestrians. Precisely these secondary objects are of particular relevance to a predictive driving style, as the latter typically move at their own speed through road traffic, wherein the direction and speed of movement may change at any time, which is why early detection is particularly advantageous.

The control and evaluation unit is preferably also designed for a longitudinal control of the motor vehicle and, in particular, for a distance control, wherein during the longitudinal control both primary objects and secondary objects, in particular the relative movements thereof with respect to the motor vehicle having the driver assistance system, are taken into account. The driver assistance system is therefore preferably designed to control a distance from a vehicle immediately in front, although the distance is not controlled solely on the basis of the distance from the vehicle immediately in front, as is the case with a driver assistance system according to the prior art but, in addition, the traffic situation in front of the vehicle immediately in front is also taken account of, at least inasmuch as this is possible, i.e. at least if, in the case of the vehicle immediately in front, a partially transparent region is detected and a viewing channel or viewing tunnel can be used, through which the traffic situation in front of the vehicle immediately in front is represented.

Thereby, inter alia, detecting hazardous situations at an early stage, in order to then be able to react early to said hazardous situations, as a result of which road traffic safety can be further increased. An additional objective is to achieve a distance control which is as smooth as possible, in which the longitudinal control is effected with the aid of low accelerations and decelerations, in which strong decelerations are, in particular, therefore avoided as far as possible. A suitably smooth control of the distance from a vehicle immediately in front is made possible by the predictive driving style, especially since it is also possible to draw conclusions from the traffic situation in front of the vehicle immediately in front with respect to the future behavior of the operator of the vehicle immediately in front and, consequently, also regarding the way that the distance from the vehicle immediately in front will develop over time. As a result, a preventive adjustment of the speed can then be effected, as a result of which any change in speed which is still required will not be as considerable, should the predicted scenario actually occur.

Therefore, if, for example, a traffic sign with a speed limit is detected in the area in front of the vehicle immediately in front, it should be assumed that the operator of the vehicle immediately in front will adjust the speed of his vehicle to the speed limit, i.e. he will in particular reduce his current speed and, consequently, the driver assistance system will preemptively adjust the speed appropriately, in particular reduce the speed, after detecting said traffic sign. The driver assistance system therefore starts adjusting the speed in most cases, before the vehicle immediately in front changes its speed, as a result of which the available window of time for a speed adjustment of the motor vehicle having the driver assistance system is increased, which, in turn, makes it possible to adjust the speed more smoothly, therefore more slowly.

In this case, it is additionally advantageous if the longitudinal control of the motor vehicle having the driver assistance system is effected as a function of the relative distance between a primary object and a secondary object or said distance is at least taken account of. In particular, in situations involving traffic congestion or where vehicles are moving in queues, changes in speed have to be made at relatively short intervals and, in these cases, there is additionally a relatively simple relationship between the relative distance between a primary object and a secondary object, therefore in particular between a vehicle immediately in front and a vehicle driving further ahead, and the distance between the motor vehicle having the driver assistance system and the primary object, therefore in particular the vehicle immediately in front, so that a necessary speed adjustment of the motor vehicle having the driver assistance system can be indicated by the development of the relative distance between the primary object and the secondary object.

In a further development, the longitudinal control not only takes account of the relative distance between the primary object and the secondary object but, in addition, the relative distance between the secondary object and an object situated in front or even additional objects, which are at even greater distances in the area in front of the motor vehicle having the driver assistance system.

According to another embodiment of the driver assistance system, the control and evaluation unit is designed to detect light signals of a lighting system of a vehicle, in particular braking signals. In this case, the speed is already changed, in particular the speed is reduced, if a corresponding light signal, for example a hazard warning light signal or a brake signal is detected, as a result of which the driver assistance system can react very early.

Additionally, the environment camera is positioned in the region of the windshield and in the region of the roof liner of the motor vehicle, since in the case of such a positioning a favorable viewing angle is achieved for the environment camera. In addition, it is expedient to use a so-called stereo camera as an environment camera, since corresponding camera systems in principle allow the distance to be determined on the basis of the image data.

Finally, sensor data or measurement data of additional sensor systems is used, in order to carry out the longitudinal control of the motor vehicle having the driver assistance system on the basis of a larger data base. This is particularly advantageous if appropriate sensor systems are provided anyway for the motor vehicle, for example for realizing additional driver assistance systems. It is hereby favorable, for example, to take account of the measurement data of a radar system during the longitudinal control, wherein the radar system is preferably configured for so-called multipath propagation. In the case of such a radar system, not only are objects or obstacles which directly reflect the radar waves and bounce them back in the direction of the transmitter detected by means of the multipath propagation, but also objects which are only hit by radar waves after being reflected by another object. In this way, it is in principle possible to not only capture vehicles immediately in front by means of radar waves, but also vehicles or objects which are located in front of the vehicles immediately in front. This takes advantage of the fact, for example, that the radar waves emitted by the motor vehicle having the radar system can also propagate between the roadway and the underbody of the vehicle immediately in front and, in this way, can also reach a vehicle driving further ahead.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
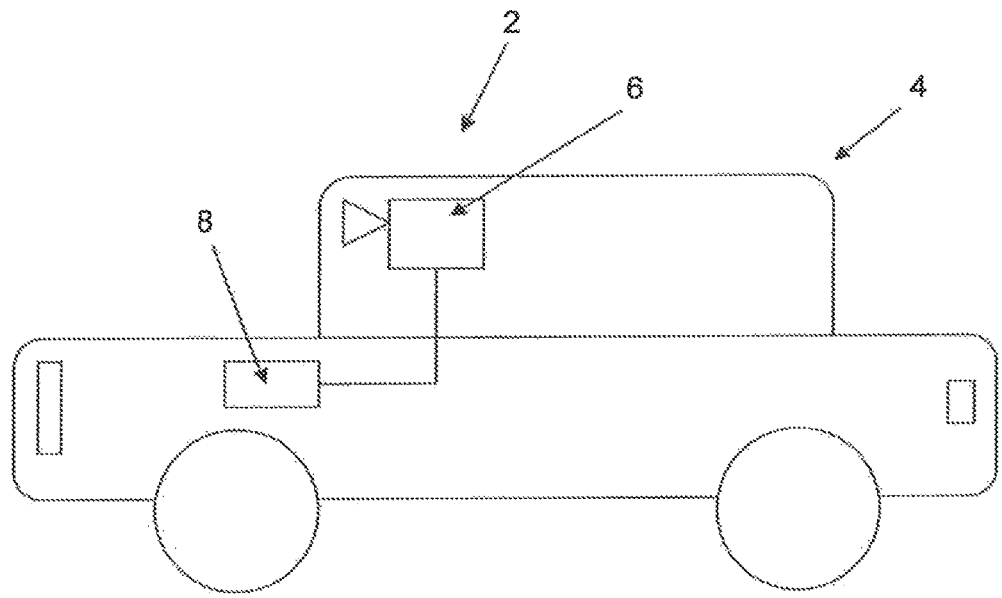
FIG. 1 shows a motor vehicle having a driver assistance system in the form of a block diagram illustration.

Parts corresponding to one another are each provided with the same reference numerals in all the figures.

A driver assistance system 2 which is described below by way of example and sketched in FIG. 1 is installed in a motor vehicle 4 and comprises an environment camera 6 as well as a control and evaluation unit 8. The environment camera 6 is hereby used to generate image data, which represent the environment or the surroundings and, in particular, the area in front of the motor vehicle 4, and these image data are then evaluated with the aid of the control and evaluation unit 8 which is alternatively integrated into the environment camera 6.

Figure 2:
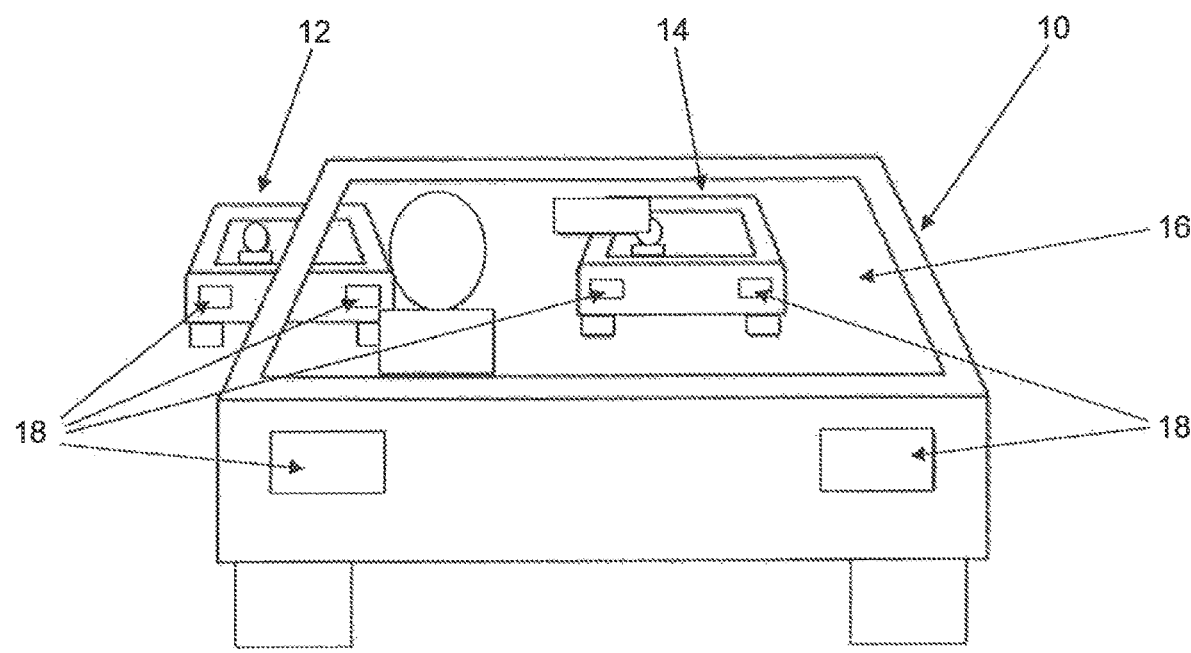
FIG. 2 shows the area in front of the motor vehicle in a forward-looking view.

An image acquired with the environment camera 6 is sketched in FIG. 2 and shows a vehicle immediately in front 10, a vehicle driving further ahead, which is positioned offset from the vehicle immediately in front 10 and which is referred to hereinafter as the offset vehicle 12, as well as a vehicle which is completely concealed by the vehicle immediately in front 10 and is accordingly referred to hereinafter as the concealed vehicle 14.

A driver or operator of the motor vehicle 4 having the driver assistance system 2 would detect or observe all three vehicles 10, 12, 14 in this situation, in that said driver or operator looks through the partially transparent viewing channel 16 which is provided due to the at least partially transparent rear window and the at least partially transparent windshield of the vehicle immediately in front 10. If the driver not only reacts to actions of the vehicle immediately in front 10, but also to appropriate actions of the other two vehicles 12, 14, this is typically described as a so-called predictive driving style.

This predictive driving style is imitated with the aid of the driver assistance system 2, wherein the control and evaluation unit 8 not only detects objects during the analysis of the image data of the environment camera 6 such as the vehicle immediately in front 10 but, in addition, also the partially transparent viewing channel 16. The image data, which represent the partially transparent viewing channel 16, are subsequently additionally evaluated, wherein objects which represent the concealed vehicle 14 or the concealed part of the offset vehicle 12 are also detected. The analysis of the image data, which represent the partially transparent viewing channel 16, is thereby effected with the aid of a modified algorithm which takes account, for example, of the fact that the windshields and/or rear windows of vehicles are occasionally tinted, which results, for example, in a change in contrast or a color shift.

As a result of the evaluation of the image data of the environment camera 6, which is configured as a so-called stereo camera, not only are the vehicles driving in front 10, 12, 14 detected but, in addition, the relative distance between the motor vehicle 4 having the driver assistance system 2 and the vehicle immediately in front 10 as well as the relative distances between the vehicle immediately in front 10 and the vehicles driving further ahead 12, 14 are determined. These relative distances are then taken as the basis for a longitudinal control of the motor vehicle 4 by means of the driver assistance system 2. The longitudinal control is used in particular to ensure that a speed-dependent minimum distance between the motor vehicle 4 having the driver assistance system 2 and the vehicle immediately in front 10, which is predetermined, i.e. stored in the control and evaluation unit 8, is not fallen below, wherein the speed is regulated as smoothly as possible within the framework of the longitudinal control.

Accordingly, not only is the speed adjusted by the driver assistance system 2 when the relative distance between the motor vehicle 4 having the driver assistance system 2 and the vehicle immediately in front 10 is modified, but it is already adjusted in the event of a change in the relative distance between the vehicle driving immediately in front 10 and a vehicle driving further ahead 12, 14, since a corresponding change can indicate that it will be necessary to adjust the speed of the motor vehicle 4 having the driver assistance system 2 in the near future.

If the relative distance between the vehicle immediately in front 10 and a vehicle driving further ahead 12, 14 is then reduced, the drive unit (not shown in more detail) of the motor vehicle 4 having the driver assistance system 2 is controlled by means of the control and evaluation unit 8 in such a way that the speed of the motor vehicle 4 is reduced. Only if the relative distance between the motor vehicle 4 having the driver assistance system 2 and the vehicle immediately in front 10 is also reduced, is the braking system (also not shown in greater detail) of the motor vehicle 4 additionally controlled by the control and evaluation unit 8 and used to reduce the speed.

In addition, the control and evaluation unit 8 is configured to detect light signals 18 and, accordingly, light signals 18 such as hazard warning lights or braking signals are detected by the control and evaluation unit 8. If a corresponding light signal 18 is then detected in the case of one of the vehicles driving further ahead 12, 14, the control and evaluation unit 8 immediately controls the braking system of the motor vehicle 4, so that said braking system is used to reduce the speed of the motor vehicle 4. If, subsequently, corresponding light signals 18 are also detected on the vehicle immediately in front 10 or if the relative distance between the motor vehicle 4 having the driver assistance system 2 and the vehicle immediately in front 10 is reduced, the deceleration which is brought about by means of the braking system is further increased, wherein the value predetermined by the control and evaluation unit 8 for the deceleration is adapted to the change in the relative distance between the motor vehicle 4 having the driver assistance system 2 and the vehicle immediately in front 10.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A driver assistance system for a motor vehicle comprising:
    an environment camera configured to be supported by the motor vehicle for generating image data which represents an environment of the motor vehicle; and
    a control and evaluation unit designed to evaluate the image data and detect objects with instructions for:
        detecting primary objects in the environment of the motor vehicle;
        determining vehicle windows in the representation of the detected primary objects; and
        detecting secondary objects in the environment of the motor vehicle and outside of the primary objects that are observed through the vehicle windows of the primary objects by evaluating the image data which represent the vehicle windows.

2. The driver assistance system of claim 1, further comprising identifying the primary objects as other vehicles.

3. The driver assistance system of claim 1, further comprising identifying the secondary objects as additional road users in the environment of the motor vehicle.

4. The driver assistance system of claim 1, wherein the control and evaluation unit is designed for a longitudinal control of the motor vehicle, wherein the longitudinal control takes account of both primary objects and secondary objects.

5. The driver assistance system of claim 1, further comprising accounting for both the primary objects and the secondary objects for longitudinal control of the motor vehicle.

6. The driver assistance system of claim 5, wherein the longitudinal control is a function of the relative distance between a primary object and a secondary object.

7. The driver assistance system of claim 5, wherein the longitudinal control takes account of measurement data of a radar system.

8. The driver assistance system of claim 1, further comprising detecting signals of a lighting system.

9. The driver assistance system of claim 8, wherein the lighting system is a brake light system for a motor vehicle.

10. The driver assistance system of claim 1, wherein the environment camera is positioned in a region of a windshield and in the region of the roof liner of the motor vehicle.

11. The driver assistance system of claim 1, wherein the environment camera is a stereo camera.

12. The driver assistance system of claim 1, wherein the system uses symmetry operators, edge detection, an analysis of the optical flow or the aid of distance-measuring to detect and evaluate the images.

13. The driver assistance system of claim 1, wherein the primary object is identified as a vehicle in the area in front of the motor vehicle and the secondary objects are in front of the vehicle in front of the motor vehicle.

14. The driver assistance system of claim 13, wherein the vehicle windows correspond to a at least partially transparent rear window and an at least partially transparent windscreen of the vehicle in front of the motor vehicle.

15. The driver assistance system of claim 12, wherein the system uses symmetry operators, edge detection, an analysis of the optical flow, and/or the aid of distance-measuring to determine vehicle windows in the representation of the detected primary objects.

16. A method for evaluating a camera image for a motor vehicle comprising:
    generating image data from a camera supported by the motor vehicle, which represents an environment of the motor vehicle;
    evaluating the image data and detecting objects with a control and evaluation unit;
    detecting primary objects in the environment of the motor vehicle;
    determining vehicle windows in the representation of the primary objects; and
    detecting secondary objects in the environment of the motor vehicle and outside of the primary objects that are observed through the vehicle windows of the primary objects by evaluating the image data which represent the vehicle windows.

17. The method of claim 16, further comprising identifying the primary objects as other vehicles.

18. The method of claim 16, further comprising identifying the secondary objects are additional road users in the environment of the motor vehicle.

19. The method of claim 16, further comprising accounting for both the primary objects and the secondary objects for longitudinal control of the motor vehicle.

20. The method of claim 19, wherein the longitudinal control is a function of the relative distance between a primary object and a secondary object.

21. The method of claim 19, wherein the longitudinal control takes account of measurement data of a radar system.

22. The method of claim 16, further comprising detecting signals of a lighting system.

23. The method of claim 22, wherein the lighting system is a brake light system for a motor vehicle.

24. The method of claim 16, wherein the environment camera is a stereo camera.

25. The method of claim 16, wherein detecting and evaluating further comprises using symmetry operators, edge detection, analysis of the optical flow or the aid of distance-measuring.

26. The method of claim 25, wherein determining vehicle windows in the representation of the detected primary objects comprises symmetry operators, edge detection, an analysis of the optical flow, and/or the aid of distance-measuring.

* * * * *